United States Patent [19]

Uno

[11] Patent Number: 4,639,813
[45] Date of Patent: Jan. 27, 1987

[54] CLEANING DISKET WITH INTERNAL PATHS FOR CLEANING LIQUID

[75] Inventor: Masatoshi Uno, Tokyo, Japan

[73] Assignee: Kabushiki Kaisha Nagaoka, Tokyo, Japan

[21] Appl. No.: 742,406

[22] Filed: Jun. 7, 1985

[30] Foreign Application Priority Data

Nov. 27, 1984 [JP] Japan .................... 59-249966

[51] Int. Cl.[4] ............ G11B 5/10; G11B 5/127; G11B 5/41; G11B 3/58
[52] U.S. Cl. ...................... 360/128; 360/133; 360/137; 369/72; 206/444
[58] Field of Search ........... 360/128, 137, 133, 97–99; 369/72, 74; 206/309, 444

[56] References Cited

U.S. PATENT DOCUMENTS

| | | | |
|---|---|---|---|
| 4,166,626 | 9/1979 | Sandor et al. | 274/47 X |
| 4,291,353 | 9/1981 | Fletcher et al. | 360/128 X |
| 4,387,411 | 6/1983 | Clausen et al. | 360/128 X |
| 4,470,083 | 9/1984 | Doering et al. | 360/128 |
| 4,490,765 | 12/1984 | Nakamats | 360/128 |
| 4,498,114 | 2/1985 | Davis | 360/128 X |
| 4,535,432 | 8/1985 | Niles et al. | 369/72 X |
| 4,558,386 | 12/1985 | Kara | 360/128 X |

FOREIGN PATENT DOCUMENTS

59-52522  8/1984  Japan ..................... 360/128

Primary Examiner—John H. Wolff
Assistant Examiner—Alfonso Garcia
Attorney, Agent, or Firm—James E. Nilles

[57] ABSTRACT

A head cleaning apparatus wherein in a case formed to the same shape and dimension of a hard case of hard-cased floppy disk a cleaning sheet formed to the same shape and dimension of the magnetic disk of floppy disk is rotatably placed and a cleaning liquid supplier is provided to the case to supply the cleaning liquid to the cleaning sheet as the cleaning liquid is injected under pressure from outside.

7 Claims, 14 Drawing Figures

CLEANING DISKET WITH INTERNAL PATHS FOR CLEANING LIQUID

BACKGROUND OF THE INVENTION

1. Field of the Invention:

The present invention relates to a drive head cleaning apparatus for cleaning a drive head of an equipment that uses a hard-cased floppy disk of, for example, 3.5 inch size.

2. Description of the Prior Art:

Various kinds of drive head cleaning apparatuses for equipment that uses floppy disk have been proposed, many of them designed to clean the drive head for the floppy disk consisting of a magnetic disk contained in a soft resin jacket.

The cleaning apparatus of conventional construction as it is, therefore, cannot be used for cleaning the drive head for the hard-cased floppy disk.

SUMMARY OF THE INVENTION

This invention has been accomplished to overcome the above problem, i.e., to provide a cleaning apparatus capable of easily cleaning the drive head of an equipment that uses hard-cased floppy disk.

The head cleaning apparatus of the invention consists of: a case formed to the same shape and size as those of the hard case of the hard-cased floppy disk; a cleaning sheet formed to the same shape as that of the floppy disk's magnetic disk rotatably installed in the case; and a cleaning liquid supplier provided to the case, the cleaning supplier being adapted to supply the cleaning liquid to the cleaning sheet as the cleaning liquid is supplied under pressure from external source.

In this invention the cleaning liquid is permeated into the cleaning sheet in the case by supplying the cleaning liquid under pressure to the cleaning liquid supplier by a constant volume pressure pump.

Other objects and features of this invention will be explained referring to the attached drawings.

DESCRIPTION OF THE PREFERRED EMBODIMENT

Figure 1:
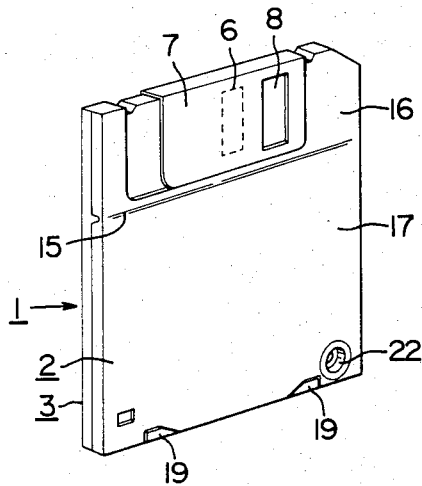
FIG. 1 is a perspective view of a head cleaning apparatus of this invention.
Figure 2:
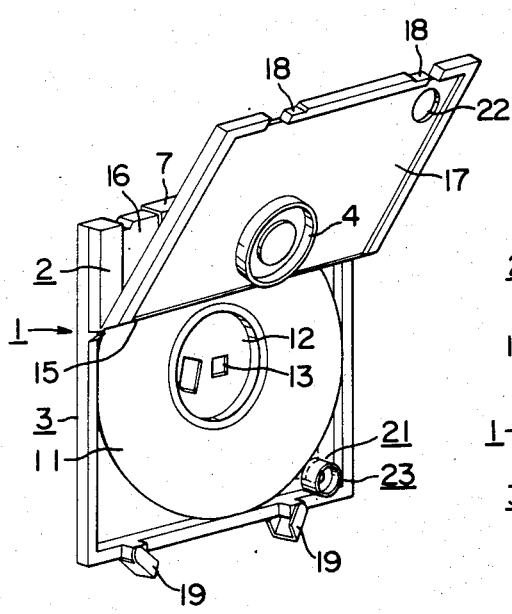
FIG. 2 is a perspective view of the head cleaning apparatus of FIG. 1 with a cover open.
Figure 3:
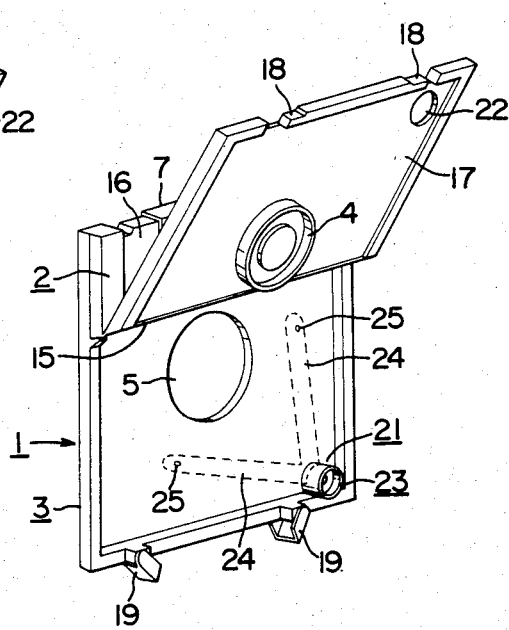
FIG. 3 is a perspective view of the head cleaning apparatus with a cleaning sheet of FIG. 2 removed.

Referring to FIGS. 1 to 3, denoted 1 is a flat square case made of synthetic resin, which is formed to the same shape and dimension as those of the hard case of the hard-cased floppy disk. The hard case may be 3.5 inch. The case 1 consists of two side plates 2, 3 which are held together with outer circumferences contacting each other. One of the side plates 2 has a cylindrical hub support 4 formed at the center of the inner side. The other side plate 3 has a circular through hole 5 at the center corresponding to the hub support 4. Rectangular head holes 6 are formed in the side plates 2, 3 at the center of the upper part of the plates so that the head holes 6 oppose each other. A metal shutter 7, shaped like a letter U in cross section, is mounted laterally slidable on the upper end of the side plates 2, 3. The shutter 7 has a pair of opposing windows 8 at one end on both legs so that they are in line with the head holes 6. The shutter 7 is urged by a spring (not shown) in such a direction as to close the head hole 6, and when the case 1 is inserted into the head of an equipment the same way as with the floppy disk, the shutter 7 moves to cause the window 8 to align with the head hole 6.

Designated 11 is a disk-like cleaning sheet into which cleaning liquid can be permeated. The cleaning sheet 11 is formed to the same shape and dimension to those of the floppy disk's magnetic disk contained in a hard case of, for instance, 3.5. inch. The sheet 11 has a metal hub 12 at the center, which also has a shaft engagement hole 13 formed at the center. The cleaning sheet 11 is fitted between the side plates 2, 3 of the case 1 with its hub 12 rotatably supported by the hub support 4.

A thin hinge 15 is formed on the side plate 2 between the head hole 6 and the hub support 4. The side plate 2 also has a cover 17 which can be opened or closed, through the hinge 15, with respect to the fixed portion 16 at the upper end. The cover 17 has notched engagement sections 18 formed at the lower end on both sides. At the lower edge of the side plate 3 corresponding to the engagement section 18, hooks 19 are rotatably fitted so that they engage with the engagement sections 18 of the side plate 2. Through the engagement and release of the hooks 19, the cover is opened and closed to install and remove the cleaning sheet 11.

The case 1 is provided with a cleaning liquid supplier 21 which supplies cleaning liquid to the cleaning sheet 11 as cleaning liquid is supplied under pressure from outside. The cleaning liquid supplier 21 consists of a hole 22 at the lower corner of the cover 17 of the side plate 2 and a liquid supply tube 23 formed at the lower corresponding corner of another side plate 3. Connected to the liquid supply tube 23 are multiple hollow paths 24 extending along the inner surface of the side plate 3. At the ends of the liquid supply paths 24 are formed liquid ejection holes 25 that oppose the cleaning sheet 11. One or more liquid ejection holes 25 may be provided at intermediate portion of the liquid supply paths 24.

Figure 4:
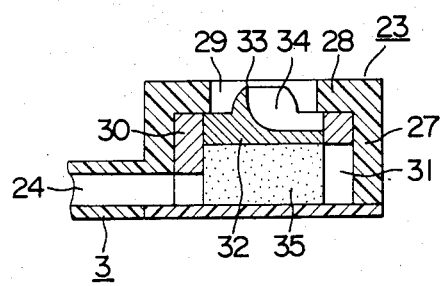
FIGS. 4 and 5 are cross sections of a liquid supplier.
Figure 5:
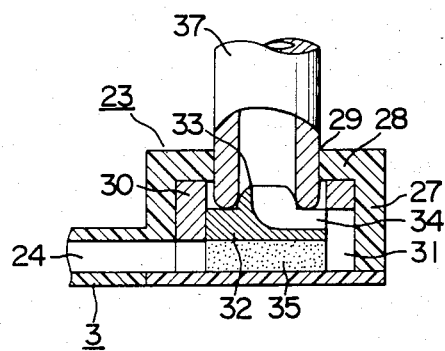

Details of the liquid supply tube 23 are shown in FIGS. 4 and 5. A circular cylinder 27 is provided to the side plate 3. The cylinder 27 has a circular liquid inlet 29 formed at the upper surface with an edge 28 remaining. Inside the cylinder 27 is fitted a guide cylinder 30, at the lower part of which an opening 31 communicating with the liquid supply paths 24 is formed. Also the guide cylinder 30 contains a backflow prevention valve 32 which is freely slidable with respect to the guide cylinder 30. The valve 32 has a projection 33 on the upper side at the center and a liquid passage 34 is formed extending from the projection 33 to one side. In the space under the valve 32 between the opening 31 and the liquid supply paths 24 is provided a spongy resilient material 35 which also serves as a filter.

As shown in FIG. 4, the valve 32 is normally urged upward by the resilient material 35 so that the outer periphery of the valve 32 engages with the inner side of the edge 28, thereby closing the liquid passage 34 by the inner surface of the guide cylinder 30.

In this condition, as a nozzle 37 of the pump is inserted into the liquid inlet 29, as shown in Figure 5, the valve 32 is forced downward against the force of resilient material 35, with the result that the liquid passage 34 is opened to the opening 31, allowing the cleaning liquid to flow from the nozzle 37 through the liquid passage 34 of the valve 32, opening 31 and the resilient filter material 35 and into the liquid supply path 24. The cleaning liquid then is emitted from the ejection holes 25 against the cleaning sheet 11.

In such a construction, when the drive head of an equipment that uses a hard-cased floppy disk is to be cleaned, the case 1 is inserted into the head as with the floppy disk. As the case is inserted, the shutter 7 moves to align the window 8 with the head hole 6 and the equipment drive mechanism turns the cleaning sheet 11. The head is then put in a sliding contact with the both sides of the cleaning sheet and is cleaned with the cleaning liquid permeated into the sheet 11.

When the cleaning liquid is running out, the nozzle 37 of the constant volume pressure pump is inserted into the liquid inlet 29 on the side plate 3 through the hole 22 of the other side plate 2 to supply cleaning liquid into the supply paths 24. The liquid is emitted from the ejection holes 25 onto the cleaning sheet 11. The newly supplied liquid now permeates into the cleaning sheet 11.

Under usual condition the valve 32 at the liquid inlet 29 prevents backflow of the cleaning liquid. The valve also keeps dirt from entering. When the cleaning sheet 11 is fouled, the cover 17 is opened to replace the sheet 11.

The case 1 is always closed except when replacing the cleaning sheet 11, so dust cannot enter from outside.

Figure 6:
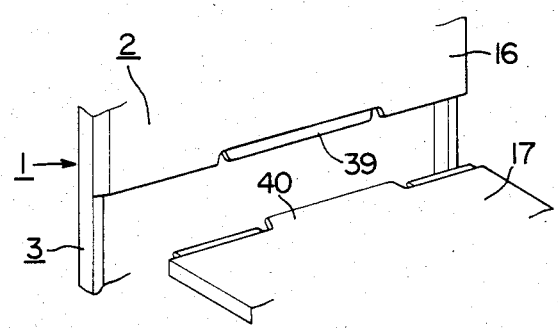
FIG. 6 is a perspective view showing a part of another embodiment.
Figure 7:
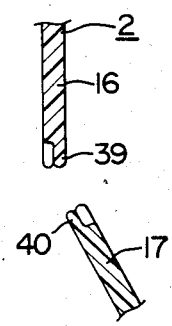
FIGS. 7 and 8 are partial cross sections of FIG. 6.
Figure 8:
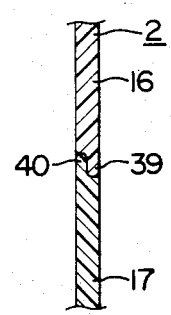

The cover 17 which in this embodiment is opened and closed by the hinge 15, may also be constructed such that, as shown in FIGS. 6 through 8, the cover 17 can be removed from the fixed portion 16 of the side plate 2 through engagement portions 39, 40 formed at the mating ends of the fixed portion 16 and the cover 17.

The case 1 may be made partially or totally transparent so that the cleaning sheet 11 can be seen from outside to permit check on the condition of contamination of the cleaning sheet 11 and the volume of cleaning liquid being supplied.

With this invention since the cleaning liquid is supplied under pressure into the cleaning liquid supplier of the case by the constant volume pressure pump to spread the liquid over the cleaning sheet, the cleaning liquid can easily be supplied and the drive head for hard-cased floppy disk easily cleaned.

In the head cleaning apparatus of the above embodiment, the shutter 7 is provided movably with respect to the head holes 6 formed in the case 1, so that when the case 1 is inserted into and removed from the head portion of the equipment to be cleaned the shutter 7 is moved auomatically to open and close the head holes 6.

However, the head holes 6 may be opened and closed by a cover operated by hand, instead of providing the shutter which is automatically opened and closed.

Figure 9:
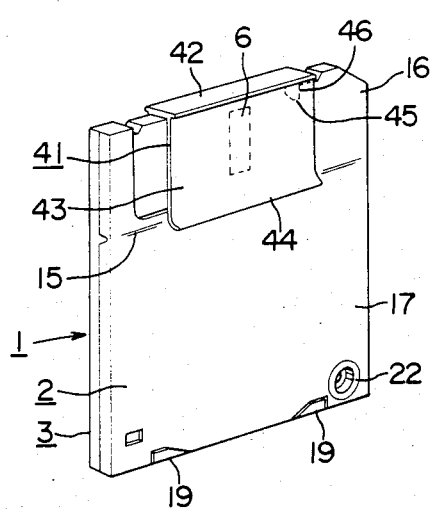
FIG. 9 is a perspective view of a head cleaning apparatus of the other embodiment of the invention with a shutter for a double head.
Figure 10:
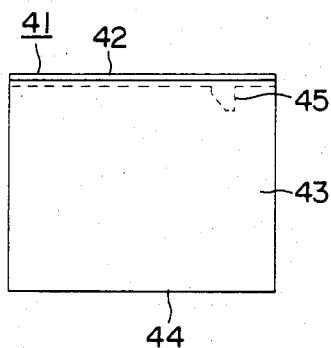
FIG. 10 is a front view of a cover for the head cleaning apparatus shown in FIG. 9.
Figure 11:
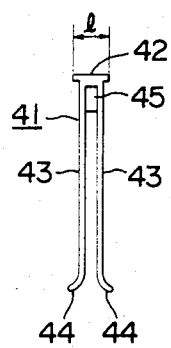
FIG. 11 is a side view of the cover shown in FIG. 10.

Specifically, in an embodiment shown in FIG. 9, a cover 41 is fitted on one side of the case 1 detachably with respect to the head holes 6. This cover 41 is made of a resilient synthetic resin as a unit and comprises an end plate 42 and two side plates 43, 43 spaced by a predetermined distance with each other and connected to said end plate 42 so as to shape like a letter U in cross-section as shown in FIGS. 10 and 11.

A guide portion 44 curved outwardly is provided at free end of each side plate 43. A projection 45 is provided on the inside of the end plate 42. The maximum thickness of the cover 41, that is, the width l of said end plate 42 is so determined that it is impossible to insert into the head portion of the equipment using the floppy disk. When said cover 41 is fitted on the one side of the case 1, the projection 45 is engaged with a cut out portion 46 for positioning formed on one end of the case 1 to close the head holes 6.

When the head of an equipment that uses a hard-cased floppy disk is to be cleaned, the cover 41 is removed from the case 1 to open the head holes 6 and the case 1 is inserted into the head portion as with the floppy disk. Then the head is cleaned with the cleaning liquid permeated into the cleaning sheet 11 as in the first embodiment.

In this case, if it is tried to insert the case 1 into the head portion without removing the cover 41 from the case 1, the case 1 can not be inserted into the head portion because the width l of the end plate 42 is larger than the head portion, so that the misuse thereof can be prevented.

Figure 12:
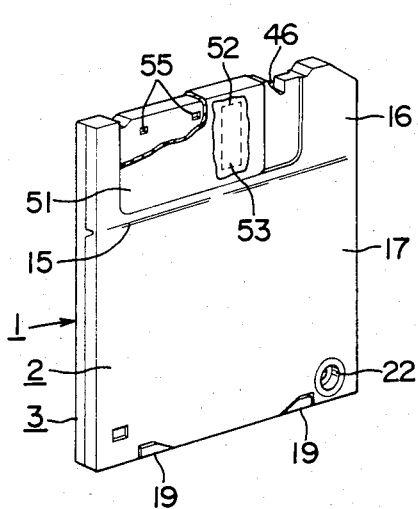
FIG. 12 is a perspective view of the head cleaning apparatus shown in FIG. 9 having a shutter for a single head with a portion thereof cut away.
Figure 13:
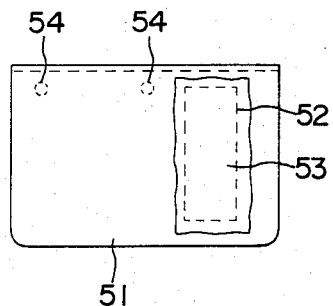
FIG. 13 is a front view of the shutter for the single head.
Figure 14:
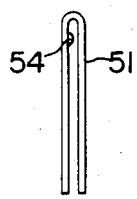
FIG. 14 is a side view of the shutter shown in FIG. 13.

Further, in the embodiment shown in FIG. 9, the head holes 6 are formed on the both side plates of the case 1 so as to be used to an equipment of double head type. If the case 1 is in use for an equipment of single head type, a shutter 51 as shown in FIGS. 12–14 is used. The shutter 51 is made of a metal such as stainless steel and shaped like a letter U in cross section. On both side plates of said shutter 51 opening windows 52 are formed corresponding to said head holes 6. A sheet 53 of soft synthetic resin is attached on one window 52. One or a plurality of projections 54 are provided on the inside of one side plate of said shutter 51.

When the head cleaning apparatus is used for the equipment of single head type, the shutter 51 is fitted on one end portion of the case 1 after the cover 41 is removed as in the previous case, so that the shutter 51 is positioned by engaging projections 54 with concave engaging portions 55 formed on the case 1 so as to coincide the head holes 6 with the windows 52. When the case 1 is inserted into the head portion of the equipment, the sheet 53 on one window 52 is brought into contact with a portion facing to the head portion and at the same time the other window 52 is brought into contact with the head portion, so that the cleaning sheet 11 is put in a sliding contact with the head portion to clean it.

What is claimed is:
1. A head cleaning apparatus comprising:
a case formed to the same shape and dimension of a hard case for a floppy disk;

a cleaning sheet adapted to be rotated in the case and formed to the same shape and dimension of the magnetic disk of a floppy disk; and a cleaning liquid inlet tube provided to the case having means for supplying a cleaning liquid to the cleaning sheet with the cleaning liquid injected under pressure from outside the case, the cleaning liquid inlet tube being in communication with liquid supply paths extending within the case, said liquid supply paths having ejection holes opposing the cleaning sheet for causing the liquid to permeate the disk.

2. A head cleaning apparatus as defined in claim 1, further comprising a valve for normally closing said cleaning liquid inlet tube.

3. A head cleaning apparatus as defined in claim 1, wherein the valve is opened when the cleaning liquid is supplied to the inlet tube.

4. A head cleaning apparatus as defined in claim 1, wherein the case has a cover hinged to the case and adapted to be opened or closed for replacing the cleaning sheet.

5. A head cleaning apparatus as defined in claim 2, wherein the case has a cover hinged to the case and adapted to be opened or closed for replacing the cleaning sheet.

6. A head cleaning apparatus as defined in claim 1, wherein the case is formed at least partially transparent so that the cleaning sheet can be seen from outside.

7. A head cleaning apparatus as defined in claim 2, wherein the case is formed at least partially transparent so that the cleaning sheet can be seen from outside.

* * * * *